Oct. 30, 1951  D. B. AVERY  2,572,966
FOUR-WHEEL CONTROL STEERING MECHANISM
Filed Dec. 9, 1949
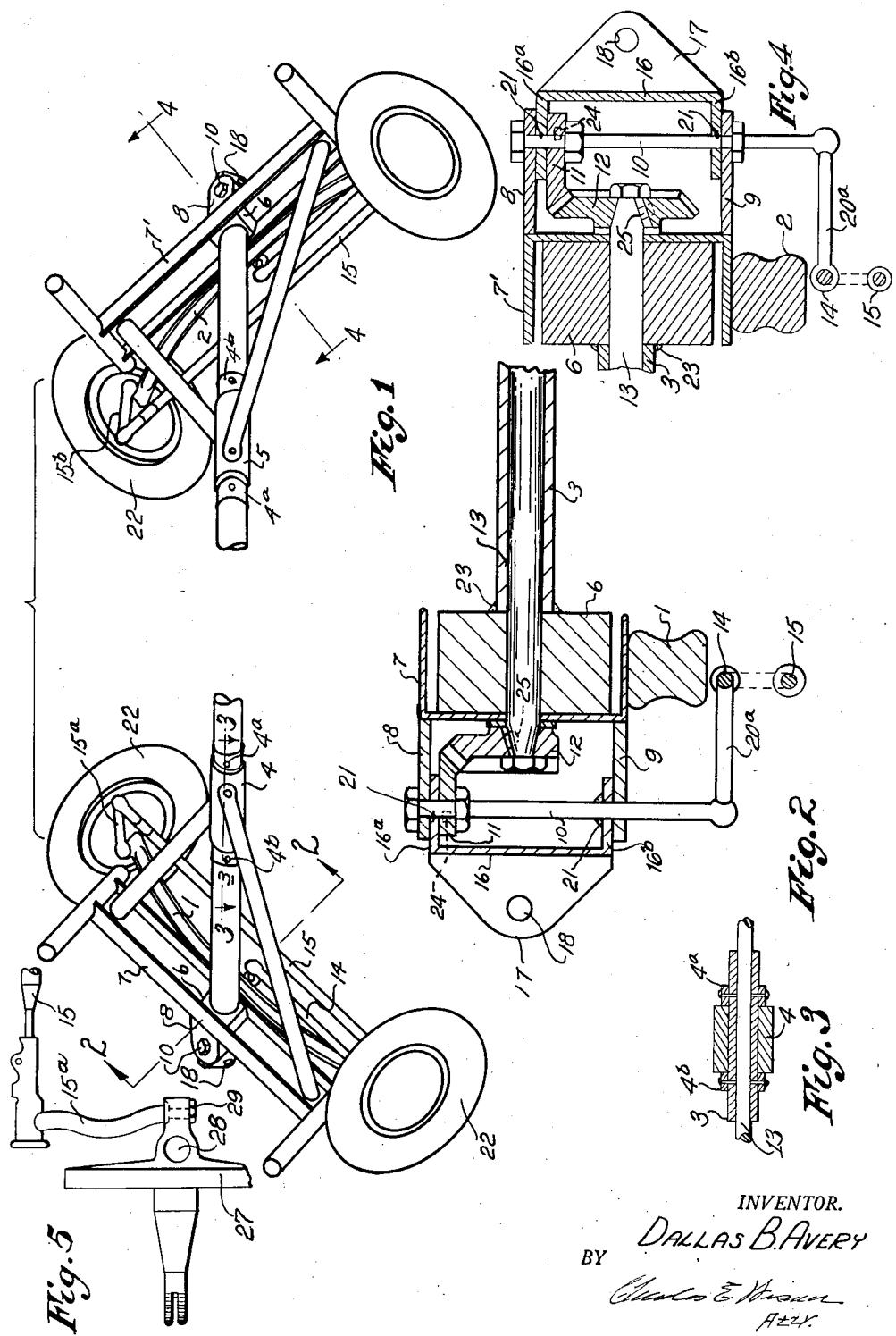
INVENTOR.
DALLAS B. AVERY
BY
Charles E. Brown
Atty.

Patented Oct. 30, 1951

2,572,966

UNITED STATES PATENT OFFICE 2,572,966

FOUR-WHEEL CONTROL STEERING MECHANISM

Dallas B. Avery, Pontiac, Mich.

Application December 9, 1949, Serial No. 132,189

2 Claims. (Cl. 280—99)

This invention originally disclosed in abandoned application Serial No. 630,387, filed November 23, 1945, relates to automobile trailer construction the object being to provide a new and improved arrangement of parts wherein the turning of a draft vehicle to one side or the other relative to a straight line causes the spindles of the trailer wheels on both the front and rear axles to be relatively turned in reverse direction about axes whereby the trailer wheels follow the track of the wheels of the draft vehicle.

These and other features and objects of the invention are hereinafter more fully described and claimed and the trailer construction embodying my invention is shown in the accompanying drawing in which—

Fig. 1 is a perspective view of the trailer chassis.

Fig. 2 is a section taken on line 2—2 of Fig. 1 showing the gear arrangement for one pair of wheels.

Fig. 3 is a section on line 3—3 of Fig. 1.

Fig. 4 is a section taken on line 4—4 of Fig. 1.

Fig. 5 is a fragmentary plan view of the vehicle wheel supporting and steering spindle, its steering arm and rod.

In Fig. 1 is shown the forward and rear axles 1 and 2 each having the usual spindles on which the wheels 22 are supported at the end of the respective axle to turn on a vertical axis. These axles are coupled together by a reach 3 having the opposite ends thereof connected to the respective bolsters 7 and 7' by means of a block 6 secured to each bolster, said reach being welded at its ends at 23 to the respective blocks. Each pair of wheels are associated with the steering arms 15b for one of the axles and 15a for the other axle at each end of the respective axles. The reach 3 is of cylindrical form and extends through the tubular members 4 and 5 for the respective axle. Collars 4a and 4b are fixed to the reach to prevent longitudinal movement of the said tubular members.

At each of its ends the reach 3 is attached to a block 6 in each bolster as shown more clearly in Fig. 2. The outer face of each bolster has opposite parallel flanges 8 and 9 extending forwardly and rearwardly of the respective bolster and the outer ends are apertured to receive a vertically positioned rotatable bolt 10 on which is keyed at 24 a segmental gear 11 turnable with the bolt. The gear 11 meshes with the segmental gear 12 keyed at 25 on the shaft 13. Shaft 13 loosely and rotatably extends through the blocks 6, and the shaft 13 has gears 12 secured at its opposite ends.

As shown more particularly in Fig. 2, the lower end of the bolt 10 extends below the lower face of the axle 1. The bolt 10 is secured by rod 20a to the cross bar 14 which is connected to a tie rod 15 which in turn is connected with the steering arms 15a as shown in Fig. 1. A plate 16 has flanges 16a and 16b secured to the bolt 10 as by the welds 21 and is therefore turnable on a vertical axis and further is provided with a forwardly extending flange 17 positioned in a plane at a right angle to the flanges 16a and 16b and has an aperture 18 to receive a cable or other appropriate means for attaching the same to a draft vehicle so that, as the draft vehicle turns to one side or the other of a horizontal line occupied by the reach 3, the plate 16 is turned thereby turning the segmental gear 11 secured to the bolt 10 which is further secured as by welds 21 to the flanges 16a and 16b of the plate 16. The segmental gear 11 meshes with the segmental gear 12 on the horizontal shaft 13 thereby rotating the shaft which, at the end thereof opposite that shown in Fig. 2 also carries a gear 12 which is connected with practically identical apparatus. The arrangement therefore provides for turning each of the four wheels about a vertical axis.

The described arrangement of parts is such that, when the draft vehicle connected with the plate 16 turns in a direction to one side or the other of the longitudinal axis of the reach 3, the forward wheels are caused to turn in one direction at an angle to a center line passing through the centers of the forward wheels and the rear wheels are turned at a reverse angle. Therefore the rear wheels follow the track of the forward wheels in either direction in which the forward wheels are turned. As illustrated in Fig. 5 the vehicle wheel spindle 27 is pivotally mounted as at 28 upon a vertical axis, and is connected at 29 to the forward end of the respective wheel steering arm 15a.

The structural arrangement of the parts of the mechanism for turning the rear wheels is practically identical with that described relative to the forward wheels. The shaft 13 is connected at its rear end with a segmental gear 12 similar to the gear 12 shown in Fig. 2 and is similarly positioned and meshes with a gear similar to the gear 11.

By the structural relationship of parts as hereinbefore described, the rear wheels will follow the track of the forward wheels in whichever direction the draft vehicle turns the plate 16. The wheel turning mechanism will function in a like manner whether the draft vehicle is connected with the plate 16 at either end of the trailer.

It is believed evident from the foregoing description that the various objects and features of the invention are attained by the structural relationship of parts as hereinbefore described and as set forth in the claims.

Having thus briefly described my invention, its utility and mode of operation, what I claim and desire to secure by Letters Patent of the United States is:

1. A trailer comprising a framework including forward and rear axles, a wheel mounting spindle pivotally secured to each end of each of said axles for turning about a vertical axis, a bolster for each of said axles, and each bolster secured to its respective axle, a wheel journaled on each of said spindles, a steering arm for each spindle and having one end secured to the corresponding spindle whereby the wheels may be turned about vertical axes, a steering rod interconnecting the free ends of the front steering arms and a steering rod interconnecting the free ends of the rear steering arms, a reach centrally interconnecting the bolsters, a pair of vertically spaced horizontal plates secured to each bolster centrally of its outer face, a rotative shaft extending through said reach and through each bolster and at right angles to said bolsters, gears on the opposite ends of said shaft, a bolt adjacent each bolster and arranged at right angles to said shaft, each of said bolts being journaled in a corresponding pair of said plates, a gear secured on each of said bolts and meshing respectively with said first gears, the gears on said bolts lying upon the same side of the axis of rotation of said shaft, an upright plate adjacent each bolster, a horizontal flange at each opposite end of each of said last named plates and the flanges for each of the said last named plates being secured to a corresponding bolt, and arranged parallel to and engaging the first named plates, means for connecting a draft vehicle with an upright plate, said means being joined to and projecting forwardly of said upright plate so that turning of the draft vehicle rotates the upright plate and bolt connected thereto, and means interconnecting one end of each of said bolts and corresponding steering rod, the arrangement being such that on turning of either pair of wheels in one direction the other pair is caused to turn in a reverse direction and in like degree.

2. A trailer comprising a framework including forward and rear axles, a wheel mounting spindle pivotally secured to each end of each of said axles for turning about a vertical axis, blocks mounted and secured upon central portions of each axle, a wheel journaled on each of said spindles, a steering arm for each spindle and having one end secured to the corresponding spindle whereby the wheels may be turned about vertical axes, a steering rod interconnecting the free ends of the front steering arms and a steering rod interconnecting the free ends of the rear steering arms, a reach joined at its ends to said blocks, a pair of vertically spaced horizontal plates secured to each block centrally of its outer face, a rotative shaft extending through said reach and through each block and at right angles to said blocks, gears on the opposite ends of said shaft, a bolt adjacent each block and arranged at right angles to said shaft, each of said bolts journaled in a corresponding pair of said plates, a gear secured on each of said bolts and meshing respectively with said first gears, the gears on said bolts lying upon the same side of the axis of rotation of said shaft, means rigidly joined to each of said bolts and projecting therefrom at right angles thereto, the outer ends of said means being adapted for connection to a draft vehicle so that turning of said draft vehicle rotates the corresponding bolt connected thereto, and means interconnecting one end of each of said bolts and the corresponding steering rod, the arrangement being such that on turning of one pair of wheels in one direction, the other pair is caused to turn in a reverse direction and in like degree.

DALLAS B. AVERY.

REFERENCES CITED

The following references are of record in the file of this patent:

UNITED STATES PATENTS

| Number | Name | Date |
|---|---|---|
| 2,383,216 | Runyan | Aug. 21, 1945 |
| 2,497,357 | Hunt | Feb. 14, 1950 |

FOREIGN PATENTS

| Number | Country | Date |
|---|---|---|
| 419,422 | Great Britain | Nov. 12, 1934 |